United States Patent
Wu et al.

(10) Patent No.: US 9,642,161 B2
(45) Date of Patent: May 2, 2017

(54) CROSS-SCHEDULING FOR RANDOM ACCESS RESPONSE

(75) Inventors: Chunli Wu, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 126 days.

(21) Appl. No.: 13/068,494

(22) Filed: May 11, 2011

(65) Prior Publication Data

US 2012/0287865 A1    Nov. 15, 2012

(51) Int. Cl.
  H04W 4/00 (2009.01)
  H04W 74/00 (2009.01)
  H04W 56/00 (2009.01)
  H04W 74/08 (2009.01)

(52) U.S. Cl.
  CPC ..... *H04W 74/006* (2013.01); *H04W 56/0045* (2013.01); *H04W 74/0833* (2013.01)

(58) Field of Classification Search
  CPC ............. H04W 74/0833; H04W 24/10; H04W 74/004; H04W 74/006; H04W 56/0045; H04L 5/0023; H04L 12/413
  See application file for complete search history.

(56) References Cited

U.S. PATENT DOCUMENTS 8,077,670 B2 * 12/2011 Fan et al. ....................... 370/330
8,705,467 B2 * 4/2014 Korhonen et al. ............ 370/329
8,780,855 B2    7/2014 Ohta et al.

(Continued)

FOREIGN PATENT DOCUMENTS

EP    2296397 A1    3/2011
JP    2010-524386 A    7/2010
(Continued)

OTHER PUBLICATIONS

Intel Corporation, May 3, 2011. "Enhancements on MAC procedures to support CA with multiple TA" 3GPP TSG RAN2#74 meeting, R2-113214. Retrieved on Sep. 29, 2015 from <http://www.3gpp.org/ftp/tsg_ran/WG2_RL2/TSGR2_74/Docs/>.*

(Continued)

*Primary Examiner* — Dustin Nguyen
*Assistant Examiner* — Juan C Turriate Gastulo
(74) *Attorney, Agent, or Firm* — Harrington & Smith

(57) ABSTRACT

In a random access procedure, a downlink random access response indicates at least a timing advance and an explicit indication identifying one component carrier or cell (CC/Cell) of a plurality of component carriers or cells, or a group of CCs/Cells, to which the timing advance applies. The eNB or UE then operate their radio on the indicated one CC/Cell synchronous with the timing advance. In various embodiments the random access response may also indicate an uplink resource granted to the user equipment, which lies on that same one or group of CCs/Cells. The explicit indication may be a single bit indicating a timing advance group; a CC/Cell/group index whose presence in the response is indicated by a flag bit; a CC/Cell/group index in the response is known from the response's format whether it includes such an index, where the format indication can be via a bit in the response itself or RRC signaling or implicit from the RACH and cross-carrier scheduling being configured.

20 Claims, 5 Drawing Sheets

(56) References Cited

U.S. PATENT DOCUMENTS

| | | | |
|---|---|---|---|
| 2007/0121560 A1* | 5/2007 | Edge | 370/338 |
| 2008/0198902 A1 | 8/2008 | Malladi | |
| 2009/0201868 A1* | 8/2009 | Chun et al. | 370/329 |
| 2009/0259910 A1* | 10/2009 | Lee | H04L 1/1822 714/748 |
| 2010/0080155 A1* | 4/2010 | Suzuki et al. | 370/310 |
| 2010/0296467 A1* | 11/2010 | Pelletier et al. | 370/329 |
| 2011/0045837 A1* | 2/2011 | Kim et al. | 455/452.1 |
| 2011/0103332 A1* | 5/2011 | Kuo | 370/329 |
| 2011/0170535 A1* | 7/2011 | Wang et al. | 370/350 |
| 2011/0194432 A1* | 8/2011 | Kato et al. | 370/252 |
| 2011/0249635 A1* | 10/2011 | Chen et al. | 370/329 |
| 2011/0249641 A1* | 10/2011 | Kwon et al. | 370/329 |
| 2012/0008600 A1* | 1/2012 | Marinier et al. | 370/336 |
| 2012/0213089 A1* | 8/2012 | Shi et al. | 370/241 |
| 2012/0218987 A1* | 8/2012 | Zhao et al. | 370/350 |
| 2012/0257513 A1* | 10/2012 | Yamada | 370/248 |
| 2012/0327910 A1* | 12/2012 | Dalsgaard | H04L 5/0098 370/335 |
| 2013/0022015 A1* | 1/2013 | Jung et al. | 370/329 |

FOREIGN PATENT DOCUMENTS

| | | |
|---|---|---|
| RU | 2384017 C2 | 3/2010 |
| RU | 2408170 C2 | 12/2010 |
| RU | 2417550 C2 | 4/2011 |
| WO | WO-2009/113815 A2 | 9/2009 |
| WO | WO 2011/044038 A2 | 4/2011 |
| WO | WO 2011/085200 A1 | 7/2011 |
| WO | WO 2011/099151 A1 | 8/2011 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.1.0, Mar. 2011, 53 pgs.

3$^{rd}$ Generation Partnership Project; Technical Specification Group Radio Access Network; Evolved Universal Terrestrial Radio Access (E-UTRA); Physical layer procedures (Release 10), 3GPP TS 36.213 V10.0.1, Dec. 2010, 5 pgs.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.3.0, Mar. 2011, 197 pgs.

3GPP TSG-RAN WG2 Meeting #67bis, R2-095898, Miyazaki, Japan, Oct. 12-16, 2009, Nokia Corporation, Nokia Siemens Networks, "RACH and Carrier Aggregation", (3 pages).

TSG-RAN WG #69bis, R2-102372, Apr. 12-16, 2010, Beijing, China, Alcatel-Lucent Shanghai Bell, Alcatel-Lucent, "Discussion on TA Timer for LTE-A CA Scenario", (3 pages).

3GPP TSG-RAN WG2 Meeting #73bis, Shanghai, China, Apr. 11-15, 2011, R2-11897, Nokia Siemens Networks, Nokia "Multiple Timing Advance", (4 pages).

3GPP TSG-RAN WG2 Meeting #75, Athens, Greece, Aug. 22-26, 2011, R2-114019, Nokia Siemens Network, Nokia "Cross Scheduling for RACH on SCell", (3 pages).

ITRI: "Considerations on TAT for Multiple TAs"; R2-113193; 3GPP TSG RAN WG2 #74; Barcelona, Spain; May 9-13, 2011; whole document (5 pages).

Intel Corporation; "Configuration of multiple TA in Rel-11 CA"; R2-113215; 3GPP TSG RAN2#74 meeting, Barcelona, Spain; May 9-13, 2011; whole document (5 pages).

R2-113214; Intel Corporation; "Enhancements on MAC procedures to support CA with multiple TA"; 3GPP TSG RAN2#74 meeting; Barcelona, Spain, May 9-13, 2011.

* cited by examiner

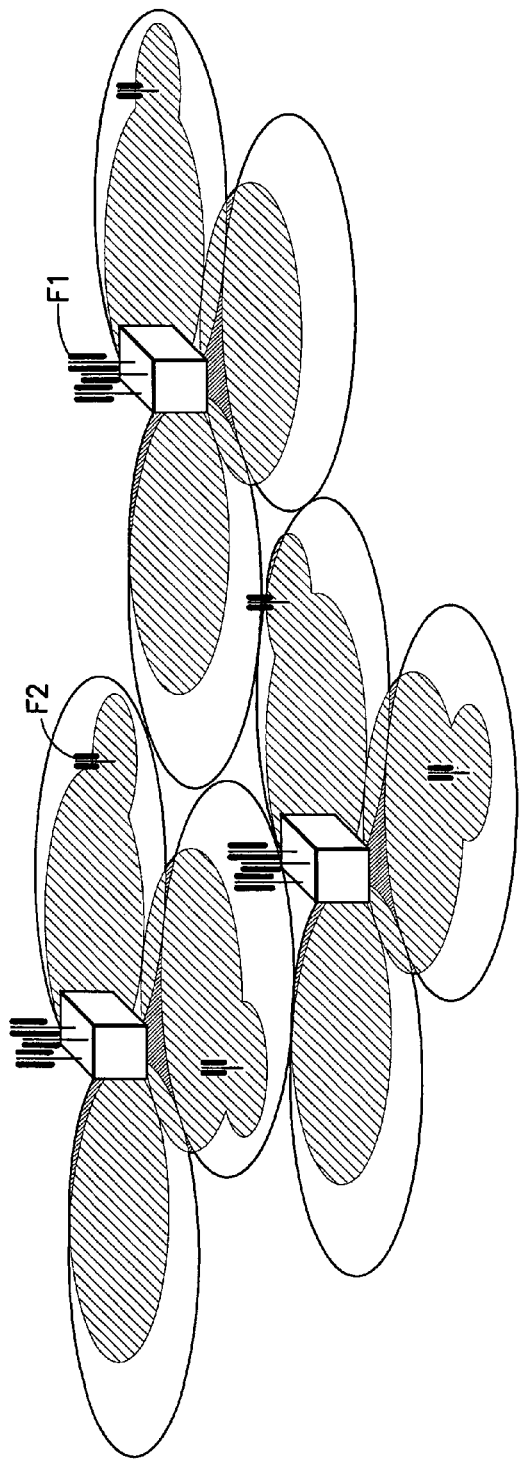

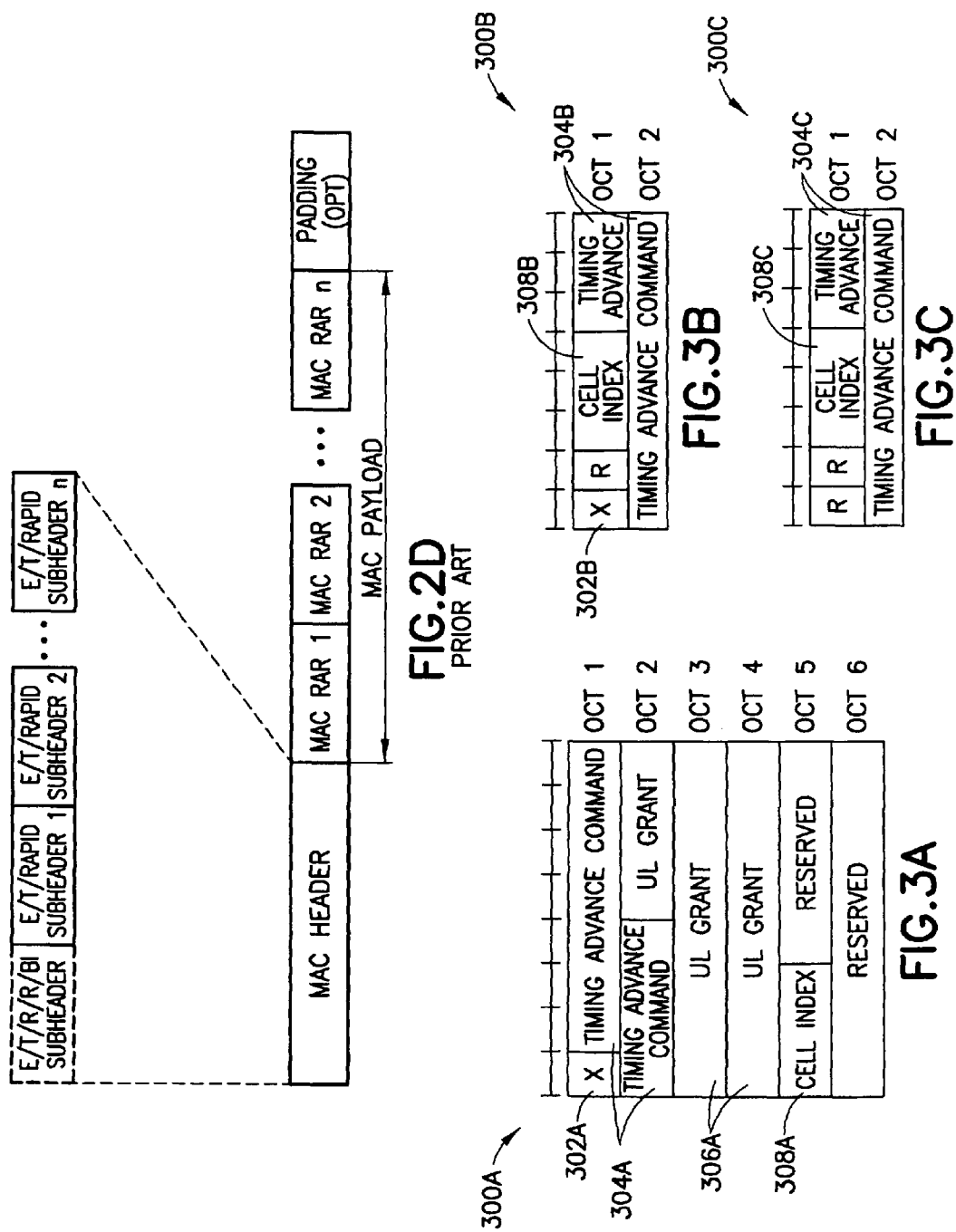

CROSS-SCHEDULING FOR RANDOM ACCESS RESPONSE

TECHNICAL FIELD

The exemplary and non-limiting embodiments of this invention relate generally to wireless communication systems, methods, devices and computer programs and, more specifically relate to cross scheduling from one component carrier or cell to another during a random access procedure.

BACKGROUND

The following abbreviations that may be found in the specification and/or the drawing figures are defined as follows:
- 3GPP third generation partnership project
- CA carrier aggregation
- CC component carrier
- CIF carrier indication field
- C-RNTI cell RNTI
- DL downlink
- eNB node B/base station in an E-UTRAN system
- E-UTRAN evolved UTRAN (LTE)
- LTE long term evolution
- LTE-A long term evolution-advanced
- MAC medium access control
- PCC/PCell primary component carrier/primary cell
- PDCCH physical downlink control channel
- PDU protocol data unit
- P-RNTI paging RNTI
- PUCCH physical uplink control channel
- PUSCH physical uplink shared channel
- RACH random access channel
- RA-RNTI random access RNTI
- RAR random access response
- RNTI radio network temporary identifier
- SCC/SCell secondary component carrier/secondary cell
- SI-RNTI system information RNTI
- TA timing advance
- UE user equipment
- UL uplink The bandwidth extension beyond 20 MHz in LTE-A (expected to be implemented in 3GPP Release 11) is done via carrier aggregation CA, in which multiple component carriers CCs are aggregated together to form a larger bandwidth. This is shown by example at FIG. 1A in which there are five Release 8 compatible CCs aggregated to form one larger LTE-A bandwidth. There is at least one CC which is backward compatible with legacy (3GPP Release 8/9) user terminals, 20 MHz wide and having all the control and traffic channel structure of Release 8. FIG. 1A is exemplary; in practice there may be more or less than five CCs, they may not have equal bandwidths, they may be frequency non-adjacent, and LTE-A is considering the case where one or more secondary CCs are in unlicensed spectrum. The CCs could be aggregated in both time division duplex TDD and frequency division duplex FDD systems.

FIG. 1A-B illustrate different exemplary scenarios in which CA may be employed. At FIG. 1B there is a macro cell F1 (e.g., a traditional cellular base station) which provides macro-area coverage and further there are remote radio heads (RRHs) F2, controlled by the macro cell F1, which are used to improve throughput at hot spots (hot spots shown by the darker shading at FIG. 1B). Mobility is performed based on the F1 coverage (shown by lighter shading at FIG. 1B). By example, F1 and F2 may operate on different bands, e.g., F1={800 MHz, 2 GHz} and F2={3.5 GHz}, etc. It is expected that F2 RRHs cells can be aggregated with the underlying F1 macro cells. In this case a UE would communicate with the F1 cell on one CC (typically the PCC) and with the F2 cells on different CCs (SCCs). These different CCs are seen by the UE as different cells.

FIG. 1C illustrates a different CA scenario, similar to that of FIG. 1B but in which frequency selective repeaters are deployed so that coverage is extended for one of the carrier frequencies. It is expected that F1 and F2 cells of the same eNB can be aggregated where coverage overlaps. In this case also the UE will see the different CCs as different cells where the F1 and F2 cells are operating on different frequencies/different CCs.

In LTE Release 8, the PDCCH which informs the individual UEs which radio resources are allocated for their traffic could only be used to indicate a PDSCH/PUSCH sent on its own DL CC or its paired UL CC (since using the hindsight of CA the Release 8 spectrum can be considered as only one CC). In LTE-Advanced, "cross-scheduling" can be available, which means the PDCCH could be used to indicate PDSCH/PUSCH resources sent on other CCs other than its own DL CC and/or its paired UL CC. From the perspective of the transmitted PDCCH this cross-scheduling is useful for distributing traffic loads among the multiple carriers.

But in the scenarios of FIGS. 1B-C the transmitters are at different distances from the UE, and so there are propagation delays to be compensated. In LTE the eNB signals a timing advance (TA) to the UE as detailed at 3GPP TS 36.321v10.1.0 (2011-March) at section 5.2. When receiving a timing advance command (TAC), the UE adjusts its uplink transmission timing as detailed at 3GPP TS 36.213 v10.0.1 (2010-December) section 6.1.1. A timing advance command can be received in a random access response or in a MAC control element. The validity of a timing advance command is controlled by the TA timer in the UE. As long as the TA timer is running, the timing advance remains valid and uplink transmissions can take place on the shared channel. Every time a timing advance command is received, the TA timer is restarted. When the TA timer expires, uplink synchronization is required and no uplink transmission can take place on the shared channel. In order for the eNB to assess the timing adjustment needed at the UE, a random access procedure is usually started.

In the continuing development of 3GPP Release 11 a new CA work item was described to "specify the support of the use of multiple timing advances in case of LTE uplink carrier aggregation" (see document RP-110451 at section 4 "Objective"; 3GPP TSG RAN Meeting #51; Kansas City, USA; Mar. 15-18, 2011). Multiple TAs are needed to cope with network-side receivers which are not co-located, such as the RRH and frequency selective repeater scenarios illustrated at FIGS. 1B-C.

3GPP Release 10 specifies that cross carrier scheduling may be used to schedule resources on a cell from another cell. The carrier indicator field (CIF) allows the PDCCH of a serving cell addressed to a UE's C-RNTI to identify another cell in which the scheduled resources lie, but 3GPP 36.300 v10.3.0 v (2011-March) at section 11.1 sets forth the following restrictions:
- Cross-carrier scheduling does not apply to PCell i.e. PCell is always scheduled via its PDCCH;
- When the PDCCH of an SCell is configured, cross-carrier scheduling does not apply to this SCell i.e. it is always scheduled via its PDCCH;

When the PDCCH of an SCell is not configured, cross-carrier scheduling applies and this SCell is always scheduled via the PDCCH of one other serving cell.

In 3GPP Release 10, no cross carrier scheduling is specified for all RACH related steps, as RACH is only supported on the PCell for Release 10 and the PCell cannot be scheduled from an SCell. When CA is configured, each CA-capable UE is configured with one PCell and optionally one or more SCells as its Serving Cell(s) but regardless the UE will have only one RRC connection with the network. The PCell is the one which provides the UE with its network access stratum mobility information, which is done at radio resource control (RRC) connection establishment, re-establishment or handover. The PCell is the one the UE uses for PUCCH transmissions, and unlike SCells once established the PCell can be changed only with a handover procedure and cannot be de-activated. So radio link failure on a PCell triggers a UE's re-establishment procedures, which is not the case if the failure is on the SCell. For further detail on the PCell and SCell(s) see 3GPP TS 36.300 v10.3.0 (2011-March) at section 7.5.

Cross scheduling scenarios such as those in FIGS. 1B-C are independent of the fact that multiple TAs might be needed. For example, assume a UE has its PCell with a macro cell F1 and also has a configured SCell with a RRH F2. If the UE loses its TA with the PCell it will perform a RACH on the PCell to obtain UL synchronization, but there is no possibility for the UL resources granted in that RACH procedure on the PCell to lie in the SCell. The possibility to cross schedule radio resources during a RACH procedure would give the network added flexibility Exemplary embodiments of the invention detailed below enable cross scheduling during a RACH procedure, which currently is not possible in LTE or LTE-A.

Besides, in 3GPP Release 10, the UE would not perform blind decoding in common search space of the SCells, as it is not expected to receive system information (scheduled by PDCCH addressed to SI-RNTI), nor paging (scheduled by PDCCH addressed to P-RNTI), nor random access response (scheduled by PDCCH addressed to RA-RNTI) on SCells. If supporting RACH procedure on SCell and the RAR of the SCell is scheduled from SCells, it would increase the number of blind decoding the UE needs to support. From this perspective, even if cross scheduling of the SCell is not configured, it would be beneficial if the RAR can be signaled from the PCell so that the UE only needs to decode the common search space of the PCell.

SUMMARY

In a first exemplary embodiment of the invention there is an apparatus comprising at least one processor and at least one memory including computer program code. The at least one memory and the computer program code are configured, with the at least one processor, cause the apparatus at least to: perform a random access procedure in which a downlink random access response from a network node to a user equipment indicates a timing advance and an explicit indication identifying one component carrier or cell of a plurality of component carriers or cells, or a group of component carriers or cells, to which the timing advance applies; and thereafter to operate a wireless radio on the indicated one or group of component carriers or cells synchronous with the timing advance.

In a second exemplary embodiment of the invention there is a method comprising: performing a random access procedure in which a downlink random access response from a network node to a user equipment indicates at least a timing advance, and an explicit indication identifying one component carrier or cell of a plurality of component carriers or cells, or a group of component carriers or cells, to which the timing advance applies; and thereafter operating a wireless radio on the indicated one or group of component carriers or cells synchronous with the timing advance.

In a third exemplary embodiment of the invention there is a computer readable memory storing a program of computer readable instructions that when executed by a processor result in actions comprising: performing a random access procedure in which a downlink random access response from a network node to a user equipment indicates at least a timing advance, and an explicit indication identifying one component carrier or cell of a plurality of component carriers or cells, or a group of component carriers or cells, to which the timing advance applies; and thereafter operating a wireless radio on the indicated one or group of component carriers or cells synchronous with the timing advance.

BRIEF DESCRIPTION OF THE DRAWINGS

FIGS. 1B-C illustrate different scenarios in which a UE would need multiple independent timing advances for different cells/component carriers, and are two exemplary environments in which embodiments of the invention may be practiced to advantage.

FIGS. 2A-B illustrate two MAC subheaders of size one octet as detailed at 3GPP TS 36.321 v10.1.0 (2011-March).

FIG. 2C illustrates a MAC random access response of size six octets as detailed at 3GPP TS 36.321 v10.1.0 (2011-March).

FIG. 2D illustrates the MAC subheaders and MAC random access response of FIGS. 2A-C assembled with optional padding bits into a MAC PDU for random access as detailed at 3GPP TS 36.321 v10.1.0 (2011-March).

FIG. 3A illustrates a random access response message according to first and second exemplary implementations as detailed further herein.

FIGS. 3B-C illustrate a random access response message according to respective third and fourth exemplary implementations as detailed further herein

DETAILED DESCRIPTION

Figure 1A:
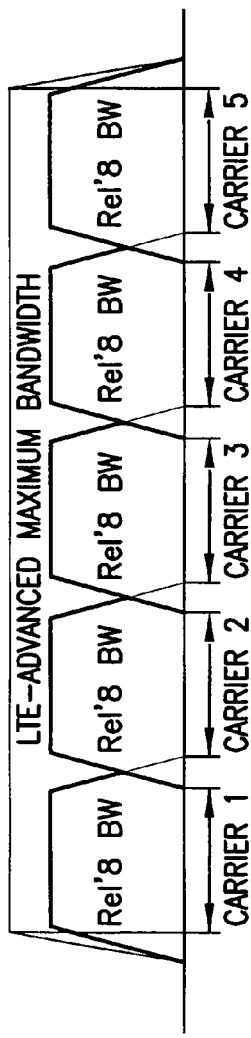
FIG. 1A is a schematic diagram of a radio spectrum in which cross-scheduling can be employed, in which five component carrier bandwidths are aggregated into a single LTE-Advanced bandwidth.
Figure 1B:
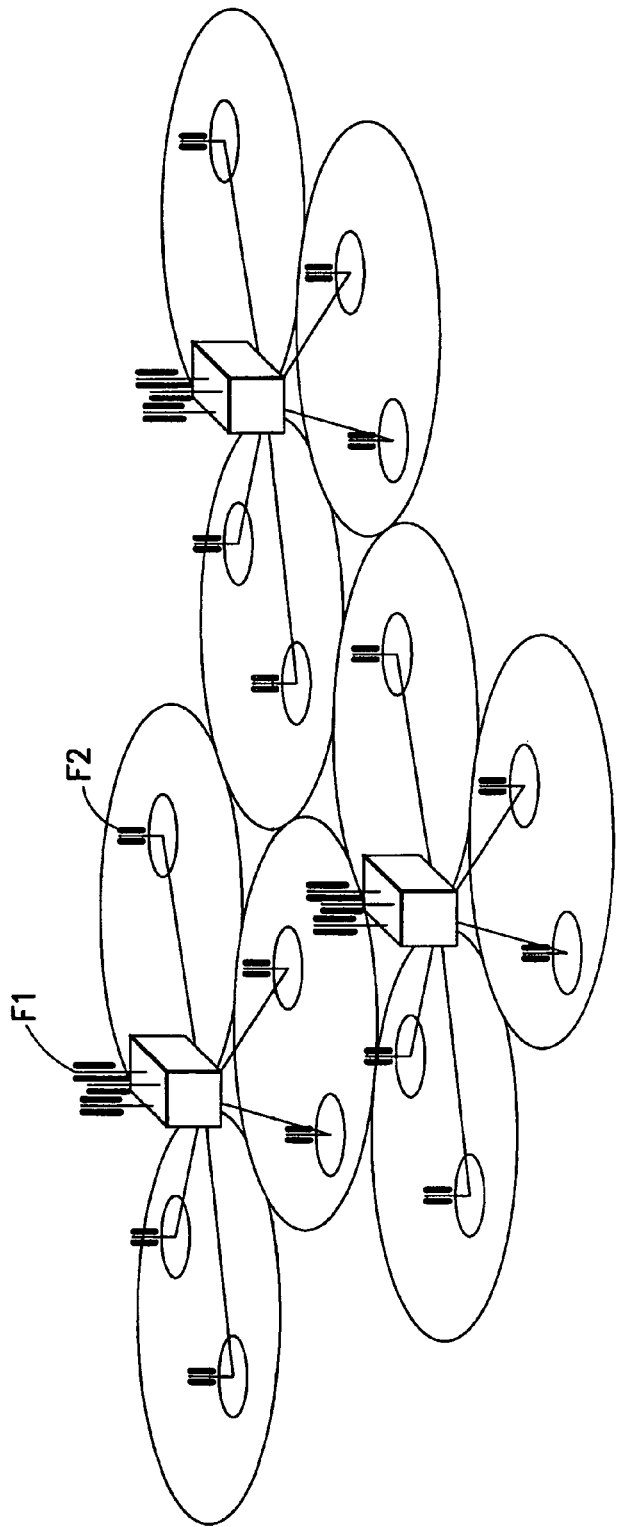

In 3GPP Release 10, a UE's RACH procedure is only possible on the PCell but Release 11 is expected to allow it on SCells. Further to the background section above, the UE does not perform blind decoding in the common search space for any SCell, so it would not be able to receive any PDCCH addressed to an RA-RNTI on an SCell. Besides, cross carrier scheduling needs to be supported for RACH related steps when RACH is introduced on SCells for multiple TA if cross carrier scheduling is configured for the SCell as the UE is not monitoring the PDCCH on that SCell.

Currently in LTE and LTE-A there is no carrier indication field CIF for the PDCCH that is addressed to the RA-RNTI for the random access response since the RA-RNTI is in a common search space. As an overview, the non-contention RACH procedure in LTE and LTE-A is as follows. First, the eNB assigns a RACH preamble to the UE via dedicated signaling. Second, the UE then sends its assigned preamble on the RACH, followed by the eNB's random access response on a DL shared channel (which maps from the UE's message containing the preamble) scheduled by PDCCH and addressed to a RA-RNTI. That random access response assigns UL resources to the UE and gives the absolute timing for the UE to synchronize against. For contention-based RACH, the UE randomly selects the preamble. FIGS. 2A-D detail the network's conventional random access response in more detail.

FIGS. 2A-D are taken from 3GPP TS 36.321 v10.1.0 (2011-March) at section 6.1.5 describing the MAC PDU for random access, which carries the network's random access response message (to one or multiple UEs). The MAC PDU consists of a MAC header and zero or more MAC random access responses, optionally with padding bits as will be shown. The MAC PDU header itself consists of one or more sub-headers of one octet (8-bits) each. FIG. 2A shows one sub-header having a one-bit field E which is an extension flag indicating if more fields are or are not present in the MAC header; a one-bit field T which is a type flag indicating whether the MAC subheader contains a random access ID (T=1) or a backoff indicator (T=0); and a six-bit field RAPID which identifies (gives the index of) the RACH preamble which the UE transmitted UL on the RACH itself. FIG. 2B shows another sub-header having a one-bit extension flag E; a one-bit type flag T; a four-bit field B1 which gives the overload condition in the cell (which the UE uses to backoff its timing for re-sending a RACH preamble in case its last RACH access attempt resulted in a collision); and the remaining two bits R are reserved and not currently in use (R=0 always).

FIG. 2C shows the structure of a MAC random access response in six octets. There is one reserved bit R not currently used (R=0); eleven bits for the TA command which gives the timing adjustment the UE is to apply in order to synchronize with the carrier; twenty bits to indicate to the granted UL resources the UE is to use; and sixteen bits for the temporary C-RNTI now assigned to the UE which it will use to identify itself after this random access response message. FIGS. 2A-C are arranged in a MAC PDU for random access as shown at FIG. 2D. The various subheaders are arranged seriatim followed by the various MAC random access responses (RARs in FIG. 2D), with padding bits (if present) following the last MAC random access response. Each individual UE gets one subheader and one MAC random access response, identified by the same index [1, 2, . . . n] in FIG. 2D.

As can be seen from FIGS. 2A-D, there are no bits or fields which indicate on which CC/Cell the UL resources identified at FIG. 2C might lie; conventionally the network and UE understand they will lie on the same CC/Cell in which the RACH lies. In order to allow cross carrier scheduling for the random access response, according to exemplary embodiments the CC/Serving Cell/group is indicated in the MAC random access response. There are various ways to implement such an indication, of which four exemplary ones are detailed below. Each of them may be considered to explicitly indicate the CC/Serving Cell/group of cells to which the TA applies (and also where the UL resource allocation lies if a UL grant is included in the random access response). Each of these example implementations are tailored to seamlessly integrate with existing LTE-A signaling regimens and formats, and of course can be modified for more ready adoption in other wireless systems.

In LTE-A a UE's different configured CCs/Cells may be arranged into TA groups; all CCs/Cells in an individual group can apply the same TA. So for example if there is configured for a UE a PCell, SCell#1 and SCell#2, in one case the PCell and SCell#1 may be in one TA group while SCell#3 is in a different TA group, and in another case each of the three configured Cells have their own timing and none two of them are grouped under the same TA.

A first implementation assumes that there are only at most two TA groups. The UE knows how its configured Cells are grouped TA-wise, and so identifying the TA group for the UE also identifies the group of CCs/Cells which are the members of that TA group. This first implementation is shown at FIG. 3A, in which the first bit position 302A of the first octet of the random access response 300A is used to indicate which TA group applies for the TA command. For example, X=0 may indicate the UE is to use the CC/Cell on which this random access response 300A was sent and X=1 may indicate to use the UE's other CC/Cell. The bits labeled cell index 308 shown at FIG. 3A are used for that purpose in the second implementation, but for this first implementation for the case that there is no UL resource grant 306A in the random access response 300A (or if there is only one CC/Cell in the UE's TA group indicated at bit 302A) those bits 308A are reserved bits 310 and not used to signal information. In this first implementation for the case the random access response 300A does include an UL resource grant 306A and/or if there is more than one CC/Cell in the indicated TA group, then those bits 308A indicate the index of the specific CC/Cell within the TA group identified at the first bit position 302A to which the UL resource grant 306A applies. Regardless of whether an UL resource grant 306A is present, the UE will apply the indicated TA 304A to all the CCs/Cells in the TA group identified by that TA-group identifier bit 302A. The first bit position 302A of the first octet at FIG. 3A is particularly defined to indicate a TA group as opposed to its conventional purpose of being reserved/not used in FIG. 2C.

A second implementation dispenses with the assumption above for the second implementation, and so there may be more than two TA groups. This second implementation is also shown at FIG. 3A and uses the first bit position 302A of the first octet as a flag to indicate that there is CC/cell/group information included in the random access response 300A (i.e. the TA and the UL resources identified in the random access response is for a CC/Cell different from that on which the random access response was sent). For example, X=1 indicates there is CC/Cell/group information in this random access response 300A and so the TA and granted UL resources are for that indicated CC/cell/group, and X=0 indicates there is none and so the TA and granted UL resources are for the same CC/cell/group on which the random access response itself was sent. Alternatively it may be specified that X=1 means the random access response 300A is a new format which includes a CC/Cell/group index, and the actual index at 308A indicates the specific CC/Cell/TA group to which the TA at field 304A applies. For the case X=1, the cell index is indicated by some of the bit positions in the last two octets of the random access response, shown in FIG. 3A within the fifth octet as the three cell index bits 308A. For the X=0 case these bits 308A would all be reserved and not used.

FIG. 2C shows these last two octets (with bits 308A and 310) as being used for the temporary C-RNTI field. There is no need to signal a temporary C-RNTI in a random access response arising from a non-contention based RACH since the preamble was assigned by the network to the UE which already has a RNTI assigned to it (which the network used to inform the UE of its RACH preamble assignment). So like the first implementation, also the second implementation re-defines bit meanings from their conventional understanding. The random access response 300A of FIG. 3A (or any of the various implementations described herein) may also be further adapted to support contention-based RACH by adding a seventh octet to give room for the CC/Cell index 308A, in case the Temporary C-RNTI at the fifth and sixth octets of FIG. 2C cannot be omitted.

Unlike the first and second implementations which re-define certain bits of existing formats, the third implementation utilizes a new format for the random access response shown by example at FIG. 3B. A leading bit 302B is a type flag indicating this random access response 300B has the new format, followed by a three-bit CC/Cell/group index 308C and an 11-bit TA command 304A. When the length of this new format random access response 300B is two octets there is no available space for signaling any UL granted resources; the UE can use this two-octet format random access response 300B in the non-contention based RACH procedure to get an updated TA value (e.g., if its TA timer has expired). But another three octets can be appended to the illustrated random access response 300B if there is a UL resource to indicate, which under current understanding in LTE-A would occupy 20 bits thus leaving the final 4 bits of the fifth/final octet unused.

Like the third implementation, the fourth implementation is also a new format for the random access response 300C shown at FIG. 3C and can be used to signal a TA command 304C and CC/Cell index 308C with or without a granted UL resource. But for FIG. 3C there is no type flag 302B and instead that bit is reserved and not used for signaling information. In this case the network may use RRC signaling to explicitly configure the UE that this new format random access response 300C should be used. Or alternatively its use may be implicit whenever cross scheduling is configured and RACH is configured on the Cell. In either case, when the UE finds its matched preamble ID (RAPID in the subheader as in FIG. 2A), it knows how to interpret the random access response.

This configuring of the random access response format (explicit in RRC signaling or implicit) can be used for any of the above embodiments. For the case in which it is used with the second and third implementation then the first bit 30-2A, 302B may then simply be reserved and not carry any information for the UE. For the case in which it is used with the first implementation that first bit 302A may still identify the TA group, or instead it may be reserved in which case the UE knows implicitly to apply the TA 304A in that random access response 300A to all CCs/Cells that are members of the same TA group as the CC/Cell identified by the index 308A.

In both the third and fourth implementations for the case in which the random access response 300B, 300C does not identify any granted UL resource, the network can inform the UE of a granted UL resource using a normal PDCCH (addressed to the UE's C-RNTI) which has a carrier indication field, once the UE obtains UL synchronization on the new CC/Cell following the RACH procedure of which the random access response 300B, 300C is a part. Whether contention-based or non-contention based, each of the random access responses detailed above for the RACH procedure are addressed to the RA-RNTI.

Also, for the third and fourth implementations, it is convenient to put those new-format random access responses 300B, 300C as the last entry/entries in the MAC PDU (see FIG. 2D) in order to facilitate backward compatibility with legacy user equipments reading their conventional random access responses in that same PDU. The first and second implementations are the same size as conventional random access responses and need not be segregated to assure backward compatibility in the same PDU.

For any of the above implementations, it is also convenient that the network send the random access response always on the PCell, identifying the CC/Cell/TA group to which the TA (and UL resource if included) applies in that random access response.

Using whichever implementation above, or modifications to any one of them, the UE then follows the RACH procedure for the indicated CC/Cell/Group, including apply the TA to the indicated CC/Cell/Group, start its TA timer for the CC/Cell/Group, transmit PUSCH on the granted UL resources on the indicated CC/Cell and transmit at a time which depends on the TA.

One technical effect of these embodiments is that cross carrier scheduling during a RACH procedure is supported without impacting the physical layer blind decoding effort which the UE conducts. Additionally, the random access responses detailed above, whether contention-based or contention-free, are scheduled by a PDCCH addressed to the RA-RNTI in the UE's common search spaces and so there is no change for the PDCCH addressed to the RA-RNTI. Therefore these techniques reduce the number of blind decodings the UE needs to support as well as the PDCCH overhead since individual random access responses for different UEs for different Cells can be put in one Random Access Response PDU, the same as the existing random access responses for different UEs where cross scheduling is not allowed as was the conventional practice (and so all random access responses were for the same CC/Cell).

Figure 4:
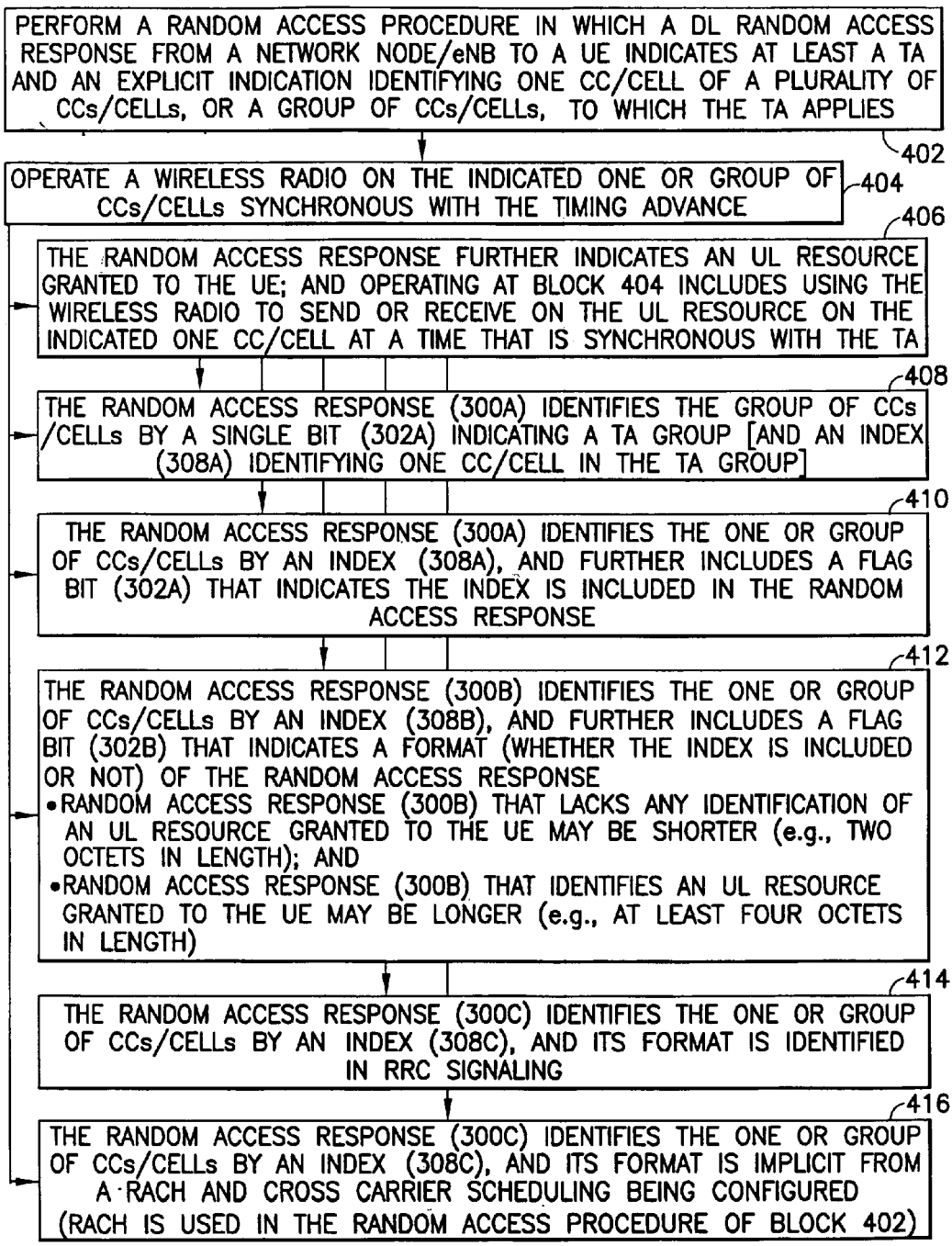
FIG. 4 is an exemplary flow diagram illustrating various embodiments of the invention from the perspective of the UE and of the eNB/network node.

The above embodiments are summarized and assembled at FIG. 4, which is a logic flow diagram that illustrates the operation of a method, and a result of execution of computer program instructions, in accordance with the exemplary embodiments of this invention. In accordance with these exemplary embodiments at block 402 there is performed a random access procedure in which a downlink random access response from a network node to a user equipment indicates at least a timing advance and an explicit indication identifying one component carrier or cell of a plurality of component carriers or cells or a group of component carriers or cells, to which the timing advance applies. At block 404 a wireless radio is operated on the indicated one or group of component carriers or cells synchronous with the timing advance of block 402.

Stating in the manner of blocks 402 and 404 reads on both the network node/eNB and the UE (or one or more components therefore). On the network side it is the eNB which compiles and sends the DL random access response at block 402. While the network node remains synchronized on the one or group of CCs/Cells throughout, it nonetheless receives the UE's UL transmission on the UL resources granted in the random access response (if such UL resources were granted, and if not still the network node transmits and receives on that one or group of CCs/Cells) and so its synchronization is consistent with the TA it provided to the UE in the random access response. On the UE side the UE receives the DL random access response of block 402, applying the TA to the one or group of CCs/Cells as indicated in the random access response and transmit PUSCH on the indicated resource (if any).

Remaining blocks of FIG. 4 are optional particular embodiments, any of which may be combined with blocks 402 and 404 and any of which read on both the network side and the UE side of the wireless divide.

Block 406 describes various implementations in which the DL random access response does grant an UL resource to the UE, in which case the UE transmits PUSCH on the uplink resource on the indicated one or group of component carriers or cells to which the timing advance is applied. The network node receives that same PUSCH.

Block 408 describes the first implementation above; the random access response (300A) identifies the group of component carriers or cells by a single bit (302A) indicating a timing advance group. For the case in which there is more than one CC/Cell in the indicated group and there is also an UL resource grant in the random access response, then also the random access response includes an index (308A) identifying one component carrier or cell within that timing advance group. In this case the TA applies to all CCs/Cells in the group (regardless of whether any UL resource grant is included), and the UL resource grant applies only to the identified one CC/Cell within the TA group.

Block 410 describes the second implementation above; the random access response (300A) identifies the one component carrier or cell or group by an index (308A), and the random access response further comprises a flag bit (302A) that indicates the index is included in the random access response.

Block 412 describes the third implementation above; the random access response (300B) identifies the one component carrier or cell or group by an index (308B), and the random access response further comprises a flag bit (302B) that indicates a format of the random access response, the different formats either having or not having the CC/Cell/group index included in the random access response. The two options whether or not this third implementation includes the UL resource grant are also summarized: if the random access response (300B) lacks any identification of an uplink resource granted to the UE it may be shorter (e.g., two octets in length); and if it does identify an uplink resource granted to the UE it may be longer (e.g., at least four octets in length).

Block 414 describes the fourth implementation above where the format (whether or not the response includes a CC/Cell/group index) is explicitly indicated to the UE apart from the random access response itself; the random access response (300C) identifies the one or group of component carriers or cells by an index (308C), and the format of the random access response is identified in RRC signaling between the network node and the UE. The two options whether or not this fourth implementation also includes the UL resource grant are the same as in block 412 but the RRC signaling indicates whether the CC/Cell/group index is included or not in the random access response.

Block 416 describes the fourth implementation above where the format of the random access response is implicit; the random access response (300C) identifies the one or group of component carriers or cells by an index (308C), and the format whether the random access response includes such an index is implicit from a RACH and cross carrier scheduling being configured (where the RACH is used in the random access procedure first stated at block 402). The two options whether or not this fourth implementation also includes the UL resource grant are the same as in block 412 but the implicit indication indicates whether the CC/Cell/group index is included or not in the random access response.

While not shown explicitly at FIG. 4, if the random access response of block 402 is considered a first RAR, then from the network's perspective it may schedule that first as well as other random access responses on a PCC/PCell (of the block 402 plurality of CCs/Cells), regardless of which CC/Cell the timing advance of the first and other random access responses applies. Further, the network can send to the UE of block 402 as well as other UEs a MAC PDU which includes a plurality of random access responses. In this case the network would dispose the first random access response within the PDU to follow all other random access responses which lack an explicit indication identifying one or a group of CCs/Cells to which their respective TA applies.

In a particular embodiment the network may use RRC signaling to explicitly configure the user equipment for the new format random access response which are detailed above. This configuring of the UE is different from the explicit or implicit format indication which identifies the format of a random access response as detailed in the above examples.

The various blocks shown in FIG. 4 may be viewed as method steps, and/or as operations that result from operation of computer program code embodied on a memory and executed by a processor, and/or as a plurality of coupled logic circuit elements constructed to carry out the associated function(s).

Figure 5:
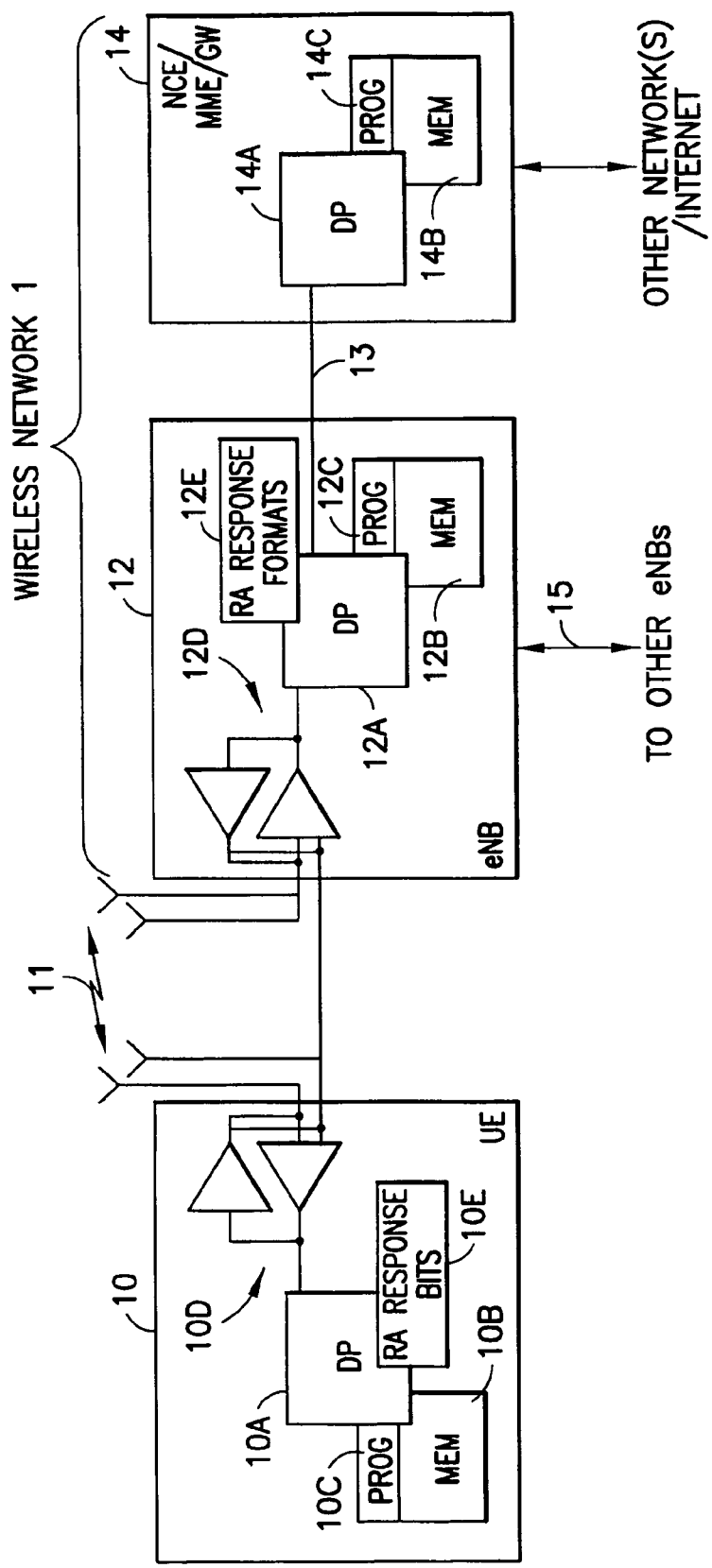
FIG. 5 is a simplified block diagram of a UE and an eNB which are exemplary electronic devices suitable for use in practicing the exemplary embodiments of the invention.

Reference is made to FIG. 5 for illustrating a simplified block diagram of various electronic devices and apparatus that are suitable for use in practicing the exemplary embodiments of this invention. In FIG. 5 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include mobility management entity/gateway MME/S-GW functionality that is specified for LTE/LTE-A. The NCE 14 also provides connectivity with a different network, such as a telephone network and/or a data communications network (e.g., the Internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas (two shown). The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas (also two shown). The eNB 12 is coupled via a data/control path 13 to the NCE 14. The path 13 may be implemented as the S1 interface known in LTE/LTE-A. The eNB 12 may also be coupled to another eNB via data/control path 15, which may be implemented as the X2 interface known in LTE/LTE-A.

At least one of the PROGs 10C and 12C is assumed to include program instructions that, when executed by the associated DP, enable the device to operate in accordance with the exemplary embodiments of this invention, as detailed above. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a RA response bit map or algorithm 10E which interprets bit meanings of the random access response message it receives according to the embodiments detailed above, possibly in conjunction with rules (e.g., the implicit format of the fourth implementation) as to whether or not cross scheduling and RACH are configured. The eNB 12 has similar functionality at block 12E but the eNB 12 also has the random access response formats which it fills with the bits.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMS 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of the LTE-Advanced system, it should be appreciated that the exemplary embodiments of this invention are not limited for use with only this one particular type of wireless communication system that uses carrier aggregation.

Further, the various names used for the described parameters and channels (e.g., RACH, PDCCH, TA) are not intended to be limiting in any respect, as these parameters may be identified by any suitable names. The use of LTE-A in the specific examples is not limiting to the broader aspects of this invention, which are viable for many CA systems apart from LTE-A which use cross-scheduling.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
at least one processor; and
at least one memory including computer program code;
in which the at least one memory and the computer program code are configured with the at least one processor to cause the apparatus at least to:
perform a random access procedure in carrier aggregation in which, upon reception of a transmission of a previously assigned preamble on one secondary cell of a plurality of component carriers or cells, a downlink random access response is sent and scheduled by a control channel addressed to a random access identifier on a primary component carrier or primary cell of a plurality of component carriers or cells;
the random access response indicating a timing advance and identifying a group of component carriers or cells, to which the timing advance applies to all component carriers or cells within the group; and thereafter
operate a wireless radio on the identified group of component carriers or cells synchronous with the timing advance.

2. The apparatus according to claim 1, in which
the downlink random access response further indicates an uplink resource granted to the user equipment, and
the at least one memory and the computer program code are configured with the at least one processor to cause the apparatus to operate the wireless radio to send or receive using the uplink resource on the identified group of component carriers or cells to which the timing advance is applied.

3. The apparatus according to claim 1, in which the random access response identifies the group of component carriers or cells by a single bit indicating a timing advance group.

4. The apparatus according to claim 1, in which the random access response identifies the group of component carriers or cells by an index, and the random access response further comprises a flag bit which indicates that the index is included in the random access response.

5. The apparatus according to claim 1, in which the random access response identifies the group of component carriers or cells by an index and a format of whether the random access response includes the index is identified by one of: radio resource signaling between a network node and a user equipment; and implicitly from a random access channel and cross carrier scheduling being configured.

6. The apparatus according to claim 1, in which the apparatus comprises a network node or one or more components therefore.

7. The apparatus according to claim 6, wherein the at least one memory and the computer program code are configured with the at least one processor to cause the apparatus at least further to:
schedule the random access responses by a control channel addressed to a random access identifier on a primary component carrier or primary cell of the plurality of component carriers or cells, regardless of which group of component carriers or cells the timing advance of the random access responses applies.

8. The apparatus according to claim 6, wherein the at least one memory and the computer program code are configured with the at least one processor to cause the apparatus at least further to:
send to a user equipment and to other user equipments a medium access control protocol data unit comprising a plurality of random access responses, in which the random access response is disposed within the protocol data unit following all other random access responses which lack an explicit indication identifying the group of component carriers or cells to which their respective timing advance applies.

9. A method, comprising:
performing a random access procedure in carrier aggregation in which, upon reception of a transmission of a previously assigned preamble on one secondary cell of a plurality of component carriers or cells, a downlink random access response is sent and scheduled by a control channel addressed to a random access identifier on a primary component carrier or primary cell of a plurality of component carriers or cells;
the random access response indicating a timing advance and identifying a group of component carriers or cells, to which the timing advance applies to all component carriers or cells within the group; and thereafter
operating a wireless radio on the identified group of component carriers or cells synchronous with the timing advance.

10. The method according to claim 9, in which:
the downlink random access response further indicates an uplink resource granted to a user equipment, and
operating the wireless radio comprises sending or receiving using the uplink resource on the identified group of component carriers or cells to which the timing advance is applied.

11. The method according to claim 9, in which the random access response identifies the group of component carriers or cells by a single bit indicating a timing advance group.

12. The method according to claim 9, in which the random access response identifies the group of component carriers or cells by an index, and the random access response further comprises a flag bit which indicates that the index is included in the random access response.

13. The method according to claim 9, in which the random access response identifies the group of component carriers or cells by an index and a format of whether the random access response includes the index is identified by one of: radio resource signaling between a network node and a user equipment; and implicitly from a random access channel and cross carrier scheduling being configured.

14. The method according to claim 9,
the method further comprising:
scheduling the random access responses by a control channel addressed to a random access identifier on a primary component carrier or primary cell of the plurality of component carriers or cells, regardless of which group of component carriers or cells the timing advance of the random access responses applies.

15. The method according to claim 9, the method further comprising:
sending to a user equipment and to other user equipments a medium access control protocol data unit comprising a plurality of random access responses, in which the random access response is disposed within the protocol data unit following all other random access responses which lack an explicit indication identifying the group of component carriers or cells to which their respective timing advance applies.

16. The method according to claim 9, in which a user equipment is explicitly configured by a network node for a format of the downlink random access response via radio resource control signaling.

17. A computer program product embodied on a non-transitory readable memory storing a program of computer readable instructions that when executed by a processor result in actions comprising:
performing a random access procedure in carrier aggregation in which, upon reception of a transmission of a previously assigned preamble on one secondary cell of a plurality of component carriers or cells, sending a downlink random access response and scheduled by a control channel addressed to a random access identifier on a primary component carrier or primary cell of a plurality of component carriers or cells;
the random access response indicating a timing advance and identifying a group of component carriers or cells, to which the timing advance applies to all component carriers or cells within the group; and thereafter
operating a wireless radio on the identified group of component carriers or cells synchronous with the timing advance.

18. An apparatus, comprising:
at least one processor; and
at least one memory including computer program code;
in which the at least one memory and the computer program code are configured with the at least one processor to cause the apparatus at least to:
perform a random access procedure in carrier aggregation where a previously assigned random access preamble is sent on one secondary cell of a plurality of component carriers or cells;
monitoring a control channel addressed to a random access identifier and receiving a random access response on a primary component carrier or primary cell of the plurality of component carriers or cells,
the random access response indicating a timing advance and identifying a group of component carriers or cells, to which the timing advance applies to all component carriers or cells within the group; and
operating a wireless radio on the identified group of component carriers or cells synchronous with the timing advance.

19. A method comprising:
performing a random access procedure in carrier aggregation where a previously assigned random access preamble is sent on one secondary cell of a plurality of component carriers or cells;

monitoring a control channel addressed to a random access identifier and receiving a random access response on a primary component carrier or primary cell of the plurality of component carriers or cells, the random access response indicating a timing advance and identifying a group of component carriers or cells, to which the timing advance applies to all component carriers or cells within the group; and operating a wireless radio on the identified group of component carriers or cells synchronous with the timing advance.

20. A computer program product embodied on a non-transitory readable memory storing a program of computer readable instructions that when executed by a processor result in actions comprising:

performing a random access procedure in carrier aggregation where a previously assigned random access preamble is sent on one secondary cell of a plurality of component carriers or cells;

monitoring a control channel addressed to a random access identifier and receiving a random access response on a primary component carrier or primary cell of the plurality of component carriers or cells, the random access response indicating a timing advance and identifying a group of component carriers or cells, to which the timing advance applies to all component carriers or cells within the group; and operating a wireless radio on the identified group of component carriers or cells synchronous with the timing advance.

* * * * *

UNITED STATES PATENT AND TRADEMARK OFFICE
CERTIFICATE OF CORRECTION

PATENT NO. : 9,642,161 B2
APPLICATION NO. : 13/068494
DATED : May 2, 2017
INVENTOR(S) : Chunli Wu and Benoist Pierre Sebire It is certified that error appears in the above-identified patent and that said Letters Patent is hereby corrected as shown below:

In the Claims

In Claim 18: Column 14, Line 54, delete "monitoring" and insert --monitor--

In Claim 18: Column 14, Line 62, delete "operating" and insert --operate--

Signed and Sealed this
Twenty-fourth Day of September, 2019

Andrei Iancu
*Director of the United States Patent and Trademark Office*